(12) United States Patent
Wu

(10) Patent No.: US 9,408,350 B1
(45) Date of Patent: Aug. 9, 2016

(54) GARDEN SHEARS

(71) Applicant: Shih-Piao Wu, Changhua (TW)

(72) Inventor: Shih-Piao Wu, Changhua (TW)

(73) Assignee: Jiin Haur Industrial Co. Ltd., Changhua (TW)

( * ) Notice: Subject to any disclaimer, the term of this patent is extended or adjusted under 35 U.S.C. 154(b) by 0 days.

(21) Appl. No.: 14/663,136

(22) Filed: Mar. 19, 2015

(51) Int. Cl.
*A01G 3/025* (2006.01)
*A01G 3/02* (2006.01)

(52) U.S. Cl.
CPC .............. *A01G 3/0251* (2013.01); *A01G 3/021* (2013.01)

(58) Field of Classification Search
CPC .............................. A01G 3/0251; A01G 3/021
USPC ............................................................ 30/245
See application file for complete search history.

(56) References Cited

U.S. PATENT DOCUMENTS

| | | | | | |
|---|---|---|---|---|---|
| 107,577 | A | * | 9/1870 | Will ...................... | B23D 29/023 30/250 |
| 476,459 | A | * | 6/1892 | Schmidt .................. | B26B 13/26 30/192 |
| 3,325,896 | A | * | 6/1967 | D Angelo ............... | A01G 3/065 30/248 |
| 4,677,748 | A | * | 7/1987 | Kobayashi ............. | H02G 1/005 30/192 |
| D367,410 | S | * | 2/1996 | Hortnagl ................ | H02G 1/005 D8/5 |
| D367,594 | S | * | 3/1996 | Hortnagl ................ | H02G 1/005 D8/5 |
| 5,570,510 | A | * | 11/1996 | Linden ................. | A01G 3/0251 30/192 |
| 5,689,888 | A | * | 11/1997 | Linden ................. | A01G 3/0251 30/192 |
| 6,938,346 | B1 | * | 9/2005 | Huang ................... | B26B 13/26 30/192 |
| 7,530,172 | B1 | * | 5/2009 | Wu ....................... | A01G 3/0251 30/244 |
| 8,069,573 | B2 | * | 12/2011 | Wu ....................... | A01G 3/0255 30/245 |
| 8,327,549 | B2 | * | 12/2012 | Huang ................... | B26B 13/26 30/190 |
| 2003/0140501 | A1 | * | 7/2003 | Linden ................. | A01G 3/0475 30/252 |
| 2004/0035004 | A1 | * | 2/2004 | Wilhelm ................ | B26D 3/169 30/245 |
| 2004/0045175 | A1 | * | 3/2004 | Jang ...................... | A01G 3/0255 30/249 |
| 2006/0277764 | A1 | * | 12/2006 | Hsien .................... | B26B 13/28 30/245 |
| 2009/0145274 | A1 | * | 6/2009 | Mikrut .................. | B23D 31/008 83/53 |
| 2009/0271991 | A1 | * | 11/2009 | Clark .................... | B23D 29/005 30/228 |
| 2010/0162575 | A1 | * | 7/2010 | Lin ....................... | A01G 3/0475 30/245 |

* cited by examiner

*Primary Examiner* — Sean Michalski
(74) *Attorney, Agent, or Firm* — Che-Yang Chen; Law Offices of Scott Warmuth

(57) ABSTRACT

A garden shears may include a first cutter, a second cutter, a spinning block and a cover. The first cutter has a connecting hole and at least one locating hole is formed outside the connecting hole, and an interlocking gear is formed on a bottom portion of the first cutter. The second cutter has an engaging hole aligning with the corresponding locating hole. A rear portion of the second cutter has a second handle to drive the second cutter to perform a cutting action. The spinning block comprises a joint section disposed inside the second handle, and a forward transmission gear engages with the interlocking gear to drive the cutter by the second handle. At least one locating pin extends from a back side of the cover to insert into the locating hole of the first cutter, so the cover can be secured on the first cutter.

6 Claims, 5 Drawing Sheets

GARDEN SHEARS

FIELD OF THE INVENTION

The present invention relates to a garden shears, and more particularly to a garden shears which is more efficient and safe to use.

BACK GROUND OF THE INVENTION

A conventional garden shears usually has two corresponding shears and a handle is disposed at a rear end thereof. A middle section of the shears has through holes for a screw and a nut to engage with each other to further secure the shears. When in use, the through holes can be used as the pivot point to open/close the shears to perform the cutting action.

However, conventional garden shears still have certain problems. For example, through simple open/close actions, conventional garden shears cannot be used to cut large tree branches, so the usage of the conventional garden shears is limited. Therefore, there remains a need for a new and improved design for a garden shears to overcome the problems presented above.

SUMMARY OF THE INVENTION

The present invention provides a structure of garden shears, which comprises a first cutter, a second cutter, a spinning block and a cover. In this embodiment, the first cutter is an anvil and a connecting hole is formed on the anvil, and at least one locating hole is formed outside the connecting hole. An interlocking gear is formed on a bottom portion of the first cutter and a rear portion thereof has a first handle. The second cutter is a blade and has an engaging hole which aligns with the corresponding locating hole of the first cutter. The first cutter and the second cutter are configured to pivotally connect with each other by a pivot unit, and perform a cutting action by opening and closing the first cutter and the second cutter. A rear portion of the second cutter has a second handle which can drive the second cutter to perform a cutting action. A first rod extends from an upper portion of the second cutter and is inserted in a lateral portion of the first handle. The spinning block comprises a joint section which is disposed inside the second handle, and a forward transmission gear engages with the interlocking gear of the first cutter to drive the cutter by the second handle. At least one locating pin extends from a back side of the cover to insert into the locating hole of the first cutter, so the cover can be secured on the first cutter and can be used to cover the transmission gear and interlocking gear.

Comparing with conventional garden shears, the present invention is advantageous because: (i) through the synchronous rotation of the spinning block and the second handle, the strength generated from rotation is transferred through the pivotal engagement between the transmission gear and interlocking gear to further drive the second cutter to easily cut large tree branches; and (ii) the cover is used to prevent external objects from falling into the transmission gear and interlocking gear to cause blocking and prevent fingers and hands from being injured to protect the users.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
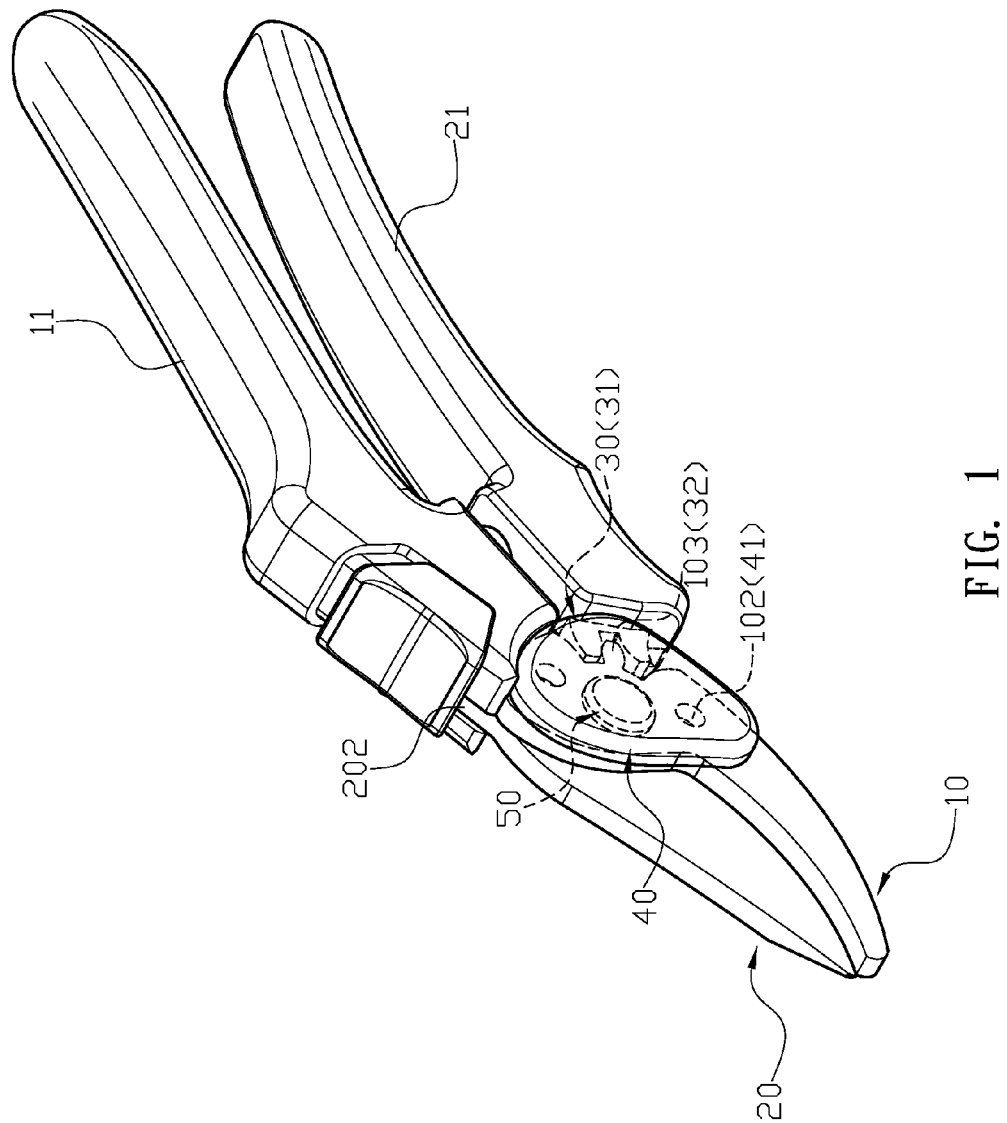
FIG. 1 is a three-dimensional view of the garden shears in the present invention.
Figure 2:
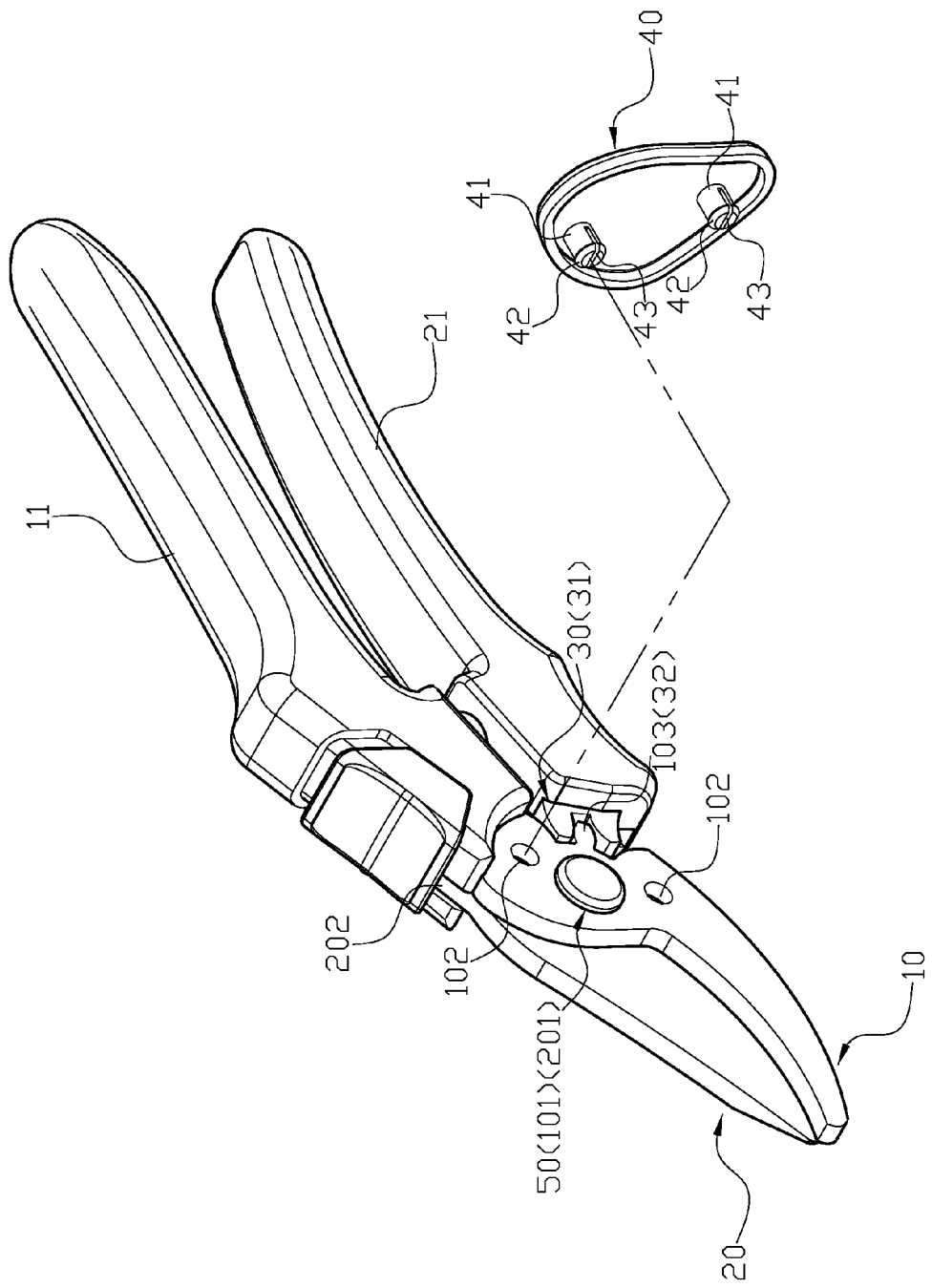
FIG. 2 is an exploded view of the garden shears in the present invention.
Figure 3:
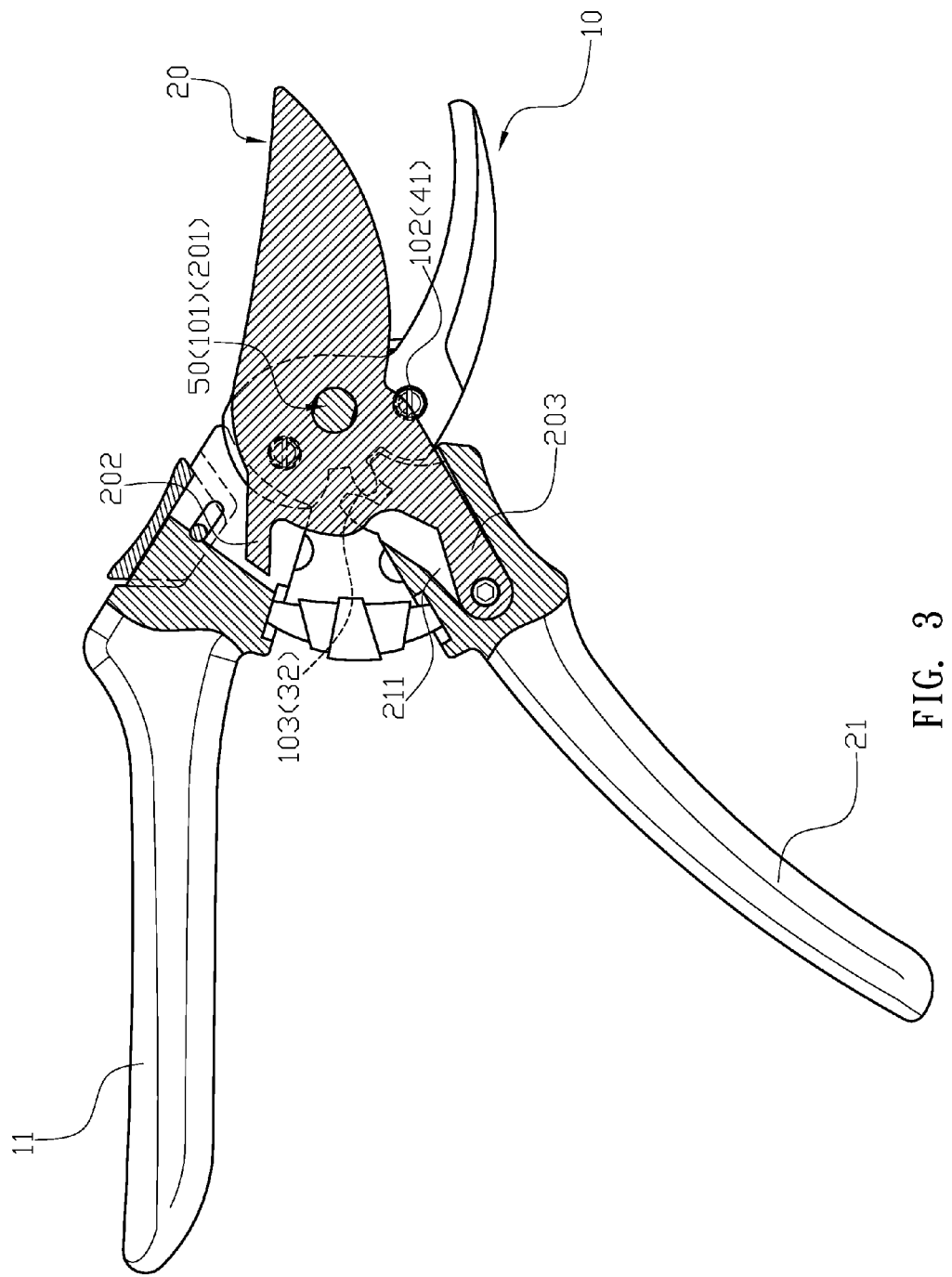
FIG. 3 is a sectional view of the garden shears in the present invention.

In order to further understand the goal, characteristics and effect of the present invention, a number of embodiments along with the drawings are illustrated as following:

Referring to FIGS. 1 to 3, the present invention provides a structure of garden shears, which comprises a first cutter (10), a second cutter (20), a spinning block (30) and a cover (40). In this embodiment, the first cutter (10) is an anvil and a connecting hole (101) is formed at a center portion of the anvil, and at least one locating hole (102) is formed outside the connecting hole (101). An interlocking gear (103) is formed on a bottom portion of the first cutter (10) and a rear portion thereof has a first handle (11). The second cutter (20) is a blade and has an engaging hole (201) which aligns with the corresponding locating hole (102) of the first cutter (10). The first cutter (10) and the second cutter (20) are configured to pivotally connect with each other by a pivot unit (50), and perform a cutting action by opening and closing the first cutter (10) and the second cutter (20). A rear portion of the second cutter (20) has a second handle (21) which can drive the second cutter (20) to perform a cutting action. A first rod (202) extends from an upper portion of the second cutter (20) and is inserted in a lateral portion of the first handle (11). The spinning block (30) comprises a joint section (31) which is disposed inside the second handle (21), and a forward transmission gear (32) engages with the interlocking gear (103) of the first cutter (10) to drive the cutter by the second handle (21). At least one locating pin (41) extends from a back side of the cover (40) to insert into the locating hole (102) of the first cutter (10), so the cover (40) can be secured on the first cutter (10) and can be used to cover the transmission gear (32) and interlocking gear (103).

In one embodiment, a second rod (203) extends from a bottom portion of the second cutter (20), and a front portion of the second handle (21) has a slot (211), which is larger than the second rod (203), to receive the second rod (203). And the lateral portion of the second cutter (20) can be locked, so the second handle (21) can be secured at a rear portion of the second cutter (20).

In another embodiment, the cover (40) is transparent. In a further embodiment, a trademark can be pasted or printed on the surface of the cover (40).

In still a further embodiment, at least one locating pins (41) has an expanded cone (42) at its lateral side, and has an elastic groove (43) to enable the locating pin (41) and the expanded cone (42) to insert into the locating hole (102) to increase the stability of the entire structure.

Figure 4:
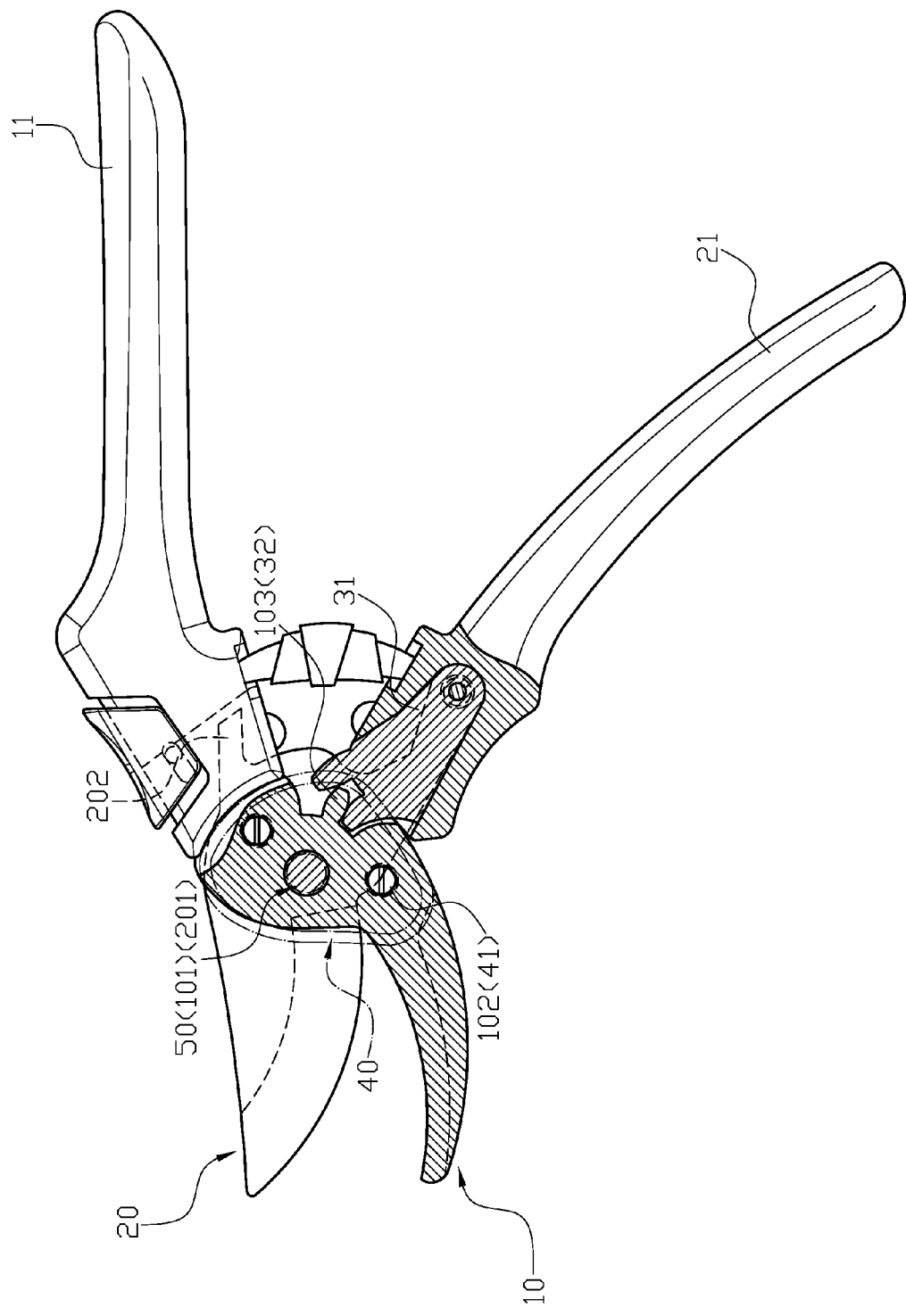
FIG. 4 is a schematic view of the garden shears in the present invention when it is open.
Figure 5:
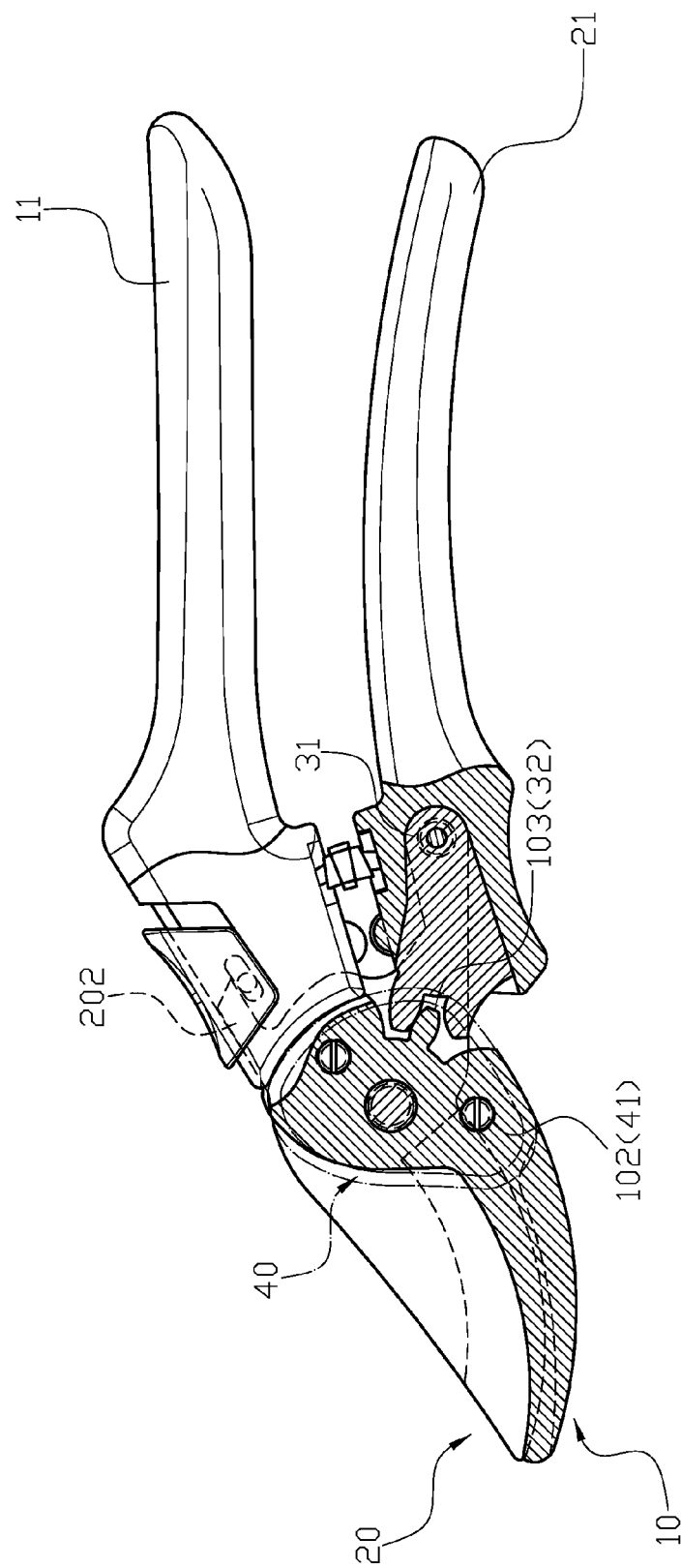
FIG. 5 is a schematic view of the garden shears in the present invention when it is closed.

Referring to FIGS. 4 and 5, when in use, the first and second cutters (10)(20) are driven by pressing the first handle (11) and the second handle (21) to perform the cutting action. By the synchronous rotation of the spinning block (30) and the second handle (21), the strength generated from rotation is transferred through the pivotal engagement between the transmission gear (32) and interlocking gear (103) to further drive the second cutter (20) to easily cut large tree branches. Furthermore, the cover (40) is used to prevent external objects from falling into the transmission gear (32) and interlocking gear (103) to cause blocking and prevent fingers and hands from being injured to protect the users.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A garden shears comprising
    a first cutter having a connecting hole formed at a center portion thereof, at least one locating hole formed outside the connecting hole, an interlocking gear formed on a bottom portion of the first cutter and a rear portion thereof has a first handle;
    a second cutter having an engaging hole that aligns with the corresponding locating hole of the first cutter, and the first cutter and the second cutter configured to pivotally connect with each other by a pivot unit to perform a cutting action; a rear portion of the second cutter having a second handle to drive the second cutter to perform the cutting action; and a first rod extending from an upper portion of the second cutter and inserted in a lateral portion of the first handle;
    a spinning block having a joint section which is disposed inside the second handle, and a forward transmission gear to engage with the interlocking gear of the first cutter; and
    a cover having at least one locating pin extending from a back side of the cover to insert into the locating hole of the first cutter, so the cover is secured on the first cutter and is used to cover the transmission gear and interlocking gear.

2. The garden shears of claim 1, wherein the first cutter is an anvil and the second cutter is a blade.

3. The garden shears of claim 1, wherein a second rod extends from a bottom portion of the second cutter, and a front portion of the second handle has a slot, which is larger than the second rod, to receive the second rod; and the lateral portion of the second cutter is locked, so the second handle is secured at a rear portion of the second cutter.

4. The garden shears of claim 1, wherein the cover is transparent.

5. The garden shears of claim 1, wherein the cover has a trademark thereon.

6. The garden shears of claim 1, wherein at least one locating pins has an expanded cone at its lateral side, and has an elastic groove to enable the locating pin and the expanded cone to insert into the locating hole to increase the stability of the entire structure.

* * * * *